US011410247B2

(12) United States Patent
Moring et al.

(10) Patent No.: US 11,410,247 B2
(45) Date of Patent: *Aug. 9, 2022

(54) AUTOMATIC TRIGGERING OF RECEIPT DELIVERY

(71) Applicant: Square, Inc., San Francisco, CA (US)

(72) Inventors: Michael Dustin Moring, San Francisco, CA (US); Brian Grassadonia, San Francisco, CA (US); Lauren A. Myrick, San Francisco, CA (US); David W. Maxwell, San Francisco, CA (US)

(73) Assignee: Square, Inc., San Francisco, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/859,969

(22) Filed: Apr. 27, 2020

(65) Prior Publication Data

US 2020/0258167 A1 Aug. 13, 2020

Related U.S. Application Data

(63) Continuation of application No. 14/160,490, filed on Jan. 21, 2014, now Pat. No. 10,810,682.

(Continued)

(51) Int. Cl.
*G06Q 40/00* (2012.01)
(52) U.S. Cl.
CPC .................... *G06Q 40/12* (2013.12)
(58) Field of Classification Search
None
See application file for complete search history.

(56) References Cited

U.S. PATENT DOCUMENTS

D376,386 S    12/1996  Sisilli
5,739,512 A *  4/1998  Tognazzini ............. G07G 5/00
                                          235/380

(Continued)

FOREIGN PATENT DOCUMENTS

CA    2 951 839 A1    9/2015
WO    2015/100378 A1  7/2015
WO    2015/138350 A1  9/2015

OTHER PUBLICATIONS

Notice of Allowance dated Feb. 7, 2020, for U.S. Appl. No. 15/900,753, of Maxwell, D.W., et al., filed Feb. 20, 2018.

(Continued)

*Primary Examiner* — Fateh M Obaid
(74) *Attorney, Agent, or Firm* — Lee & Hayes, P.C.

(57) ABSTRACT

Disclosed herein is a technology for automatically triggering delivery of a digital receipt for a financial transaction based on a previously stored electronic address for receiving digital receipts. In at least some embodiments, the technology includes a digital receipt system working in coordination with one or more merchants' POS device to deliver receipts for current transactions based on a previously stored electronic address from past transactions. The first time a user utilizes a payment instrument in a transaction, the system associates and stores the payment-instrument information with an identifier of the user. The next time a transaction is detected that involves the identifier, the system automatically triggers receipt delivery to an electronic address associated with the identifier.

20 Claims, 8 Drawing Sheets

Related U.S. Application Data

(60) Provisional application No. 61/921,064, filed on Dec. 26, 2013.

(56) References Cited

U.S. PATENT DOCUMENTS

| | | | |
|---|---|---|---|
| 5,878,337 | A | 3/1999 | Joao et al. |
| 5,956,693 | A | 9/1999 | Geerlings |
| 7,085,812 | B1 | 8/2006 | Sherwood |
| D547,371 | S | 7/2007 | Miller |
| 7,415,492 | B2 | 8/2008 | Soliman |
| 7,764,185 | B1 | 7/2010 | Manz et al. |
| D621,872 | S | 8/2010 | Jordan |
| 7,783,515 | B1* | 8/2010 | Kumar ............... G06Q 20/10 705/16 |
| 7,810,729 | B2 | 10/2010 | Morley, Jr. |
| D641,040 | S | 7/2011 | Tetrault |
| D657,414 | S | 4/2012 | Liu et al. |
| 8,180,682 | B2 | 5/2012 | Narayanaswami et al. |
| 8,224,700 | B2 | 7/2012 | Silver |
| 8,396,808 | B2 | 3/2013 | Greenspan |
| 8,534,551 | B2 | 9/2013 | Rothschild |
| 8,595,075 | B2 | 11/2013 | de Sylva |
| 8,892,462 | B1 | 11/2014 | Borovsky et al. |
| 8,965,791 | B1 | 2/2015 | Bell et al. |
| 9,495,670 | B2 | 11/2016 | Bell et al. |
| 9,811,813 | B2 | 11/2017 | Laracey |
| D832,344 | S | 10/2018 | Bell |
| 2002/0188561 | A1* | 12/2002 | Schultz ............... G06Q 20/047 705/40 |
| 2003/0204447 | A1 | 10/2003 | Dalzell et al. |
| 2004/0030600 | A1 | 2/2004 | Lacroix |
| 2004/0054592 | A1 | 3/2004 | Hernblad |
| 2004/0158494 | A1 | 8/2004 | Suthar |
| 2004/0167820 | A1 | 8/2004 | Melick et al. |
| 2004/0197489 | A1 | 10/2004 | Heuser et al. |
| 2004/0225509 | A1 | 11/2004 | Andre |
| 2005/0071232 | A1 | 3/2005 | Frater |
| 2006/0143087 | A1 | 6/2006 | Tripp et al. |
| 2006/0261149 | A1 | 11/2006 | Raghavendra Tulluri |
| 2007/0045405 | A1 | 3/2007 | Rothschild |
| 2007/0050305 | A1* | 3/2007 | Klein ............... G06Q 20/3674 705/67 |
| 2007/0069013 | A1* | 3/2007 | Seifert ............... G06Q 20/20 235/383 |
| 2008/0040265 | A1 | 2/2008 | Rackley, III et al. |
| 2008/0065396 | A1 | 3/2008 | Marshall |
| 2008/0177624 | A9 | 7/2008 | Dohse |
| 2008/0197188 | A1 | 8/2008 | Jagatic et al. |
| 2009/0192898 | A1 | 7/2009 | Baril |
| 2009/0271265 | A1* | 10/2009 | Lay ............... G06Q 20/204 705/14.38 |
| 2009/0292595 | A1* | 11/2009 | Tonnison ............... G06Q 30/0207 705/14.1 |
| 2009/0313132 | A1* | 12/2009 | McKenna ............... G06Q 20/047 705/21 |
| 2010/0177343 | A1 | 7/2010 | Shapiro et al. |
| 2010/0217675 | A1 | 8/2010 | Bookstaff |
| 2010/0217699 | A1 | 8/2010 | Bookstaff |
| 2010/0269059 | A1 | 10/2010 | Olthmer et al. |
| 2010/0325048 | A1 | 12/2010 | Carlson et al. |
| 2010/0332265 | A1* | 12/2010 | Smith ............... G06Q 30/02 705/4 |
| 2011/0106840 | A1 | 5/2011 | Barrett et al. |
| 2011/0184822 | A1* | 7/2011 | Matkovic ............... G06Q 20/209 705/18 |
| 2011/0264581 | A1 | 10/2011 | Clyne |
| 2012/0066065 | A1 | 3/2012 | Switzer |
| 2012/0084135 | A1* | 4/2012 | Nissan ............... G06Q 30/06 705/14.38 |
| 2012/0290420 | A1 | 11/2012 | Close |
| 2013/0006782 | A1 | 1/2013 | Schwarzkopf et al. |
| 2013/0124262 | A1 | 5/2013 | Anchala |
| 2013/0132140 | A1 | 5/2013 | Amin et al. |
| 2013/0132246 | A1 | 5/2013 | Amin et al. |
| 2013/0132274 | A1 | 5/2013 | Amin et al. |
| 2013/0132887 | A1 | 5/2013 | Henderson et al. |
| 2013/0159446 | A1 | 6/2013 | Carlson et al. |
| 2013/0166332 | A1 | 6/2013 | Hammad |
| 2013/0198018 | A1 | 8/2013 | Baig |
| 2013/0225075 | A1 | 8/2013 | Schmid et al. |
| 2013/0238455 | A1 | 9/2013 | Laracey |
| 2013/0246207 | A1 | 9/2013 | Novak et al. |
| 2013/0246301 | A1 | 9/2013 | Radhakrishnan et al. |
| 2014/0052613 | A1 | 2/2014 | Tavakoli et al. |
| 2014/0100931 | A1 | 4/2014 | Sanchez et al. |
| 2014/0129135 | A1 | 5/2014 | Holden et al. |
| 2014/0129302 | A1 | 5/2014 | Amin et al. |
| 2014/0129441 | A1* | 5/2014 | Blanco ............... G06Q 20/322 705/44 |
| 2014/0129951 | A1 | 5/2014 | Amin et al. |
| 2014/0180790 | A1* | 6/2014 | Boal ............... G06Q 30/0211 705/14.42 |
| 2014/0180793 | A1 | 6/2014 | Boal |
| 2014/0337175 | A1 | 11/2014 | Katzin et al. |
| 2015/0149271 | A1 | 5/2015 | Battle et al. |
| 2015/0187021 | A1 | 7/2015 | Moring et al. |
| 2015/0220937 | A1 | 8/2015 | Iannace et al. |
| 2015/0254628 | A1 | 9/2015 | Bell et al. |
| 2017/0039540 | A1 | 2/2017 | Bell et al. |
| 2018/0181941 | A1 | 6/2018 | Maxwell et al. |
| 2019/0385142 | A1 | 12/2019 | Bell et al. |
| 2020/0279241 | A1 | 9/2020 | Maxwell et al. |
| 2022/0058613 | A1 | 2/2022 | Maxwell et al. |

OTHER PUBLICATIONS

Notice of Allowance dated Jun. 11, 2020, for U.S. Appl. No. 14/160,490, of Moring, D., et al., filed Jan. 21, 2014.

International Search Report and Written Opinion for International Application No. PCT/US2014/72269, dated Mar. 31, 2015.

International Search Report and Written Opinion for International Application No. PCT/US2015/019518, dated Jun. 18, 2015.

Extended European Search Report for European Patent Application No. 15760811.8, dated Jul. 14, 2017.

First Examination Report for Australian Patent Application No. 2015229659, dated Mar. 20, 2019.

Examination Report, for European Patent Application No. 15760811.8, dated Jun. 14, 2019.

Second Examination Report for Australian Patent Application No. 2015229659, dated Feb. 12, 2020.

Third Examination Report for Australian Patent Application No. 2015229659, dated Mar. 20, 2020.

"Card Not Present Transaction," Wikipedia, published Mar. 4, 2014, Retrieved from the Internet URL: http://en.wikipedia.org/wiki/Card_not_present_transaction, on Jun. 6, 2014, pp. 1-2.

"Online Shopping," dated Nov. 2, 2014, Retrieved from the Internet URL: http://en.wikipedia.org/wiki/Online_shopping, on Nov. 10, 2014, pp. 1-12.

"Payment Gateway," Wikipedia, published May 30, 2014, Retrieved from the Internet URL: http://en.wikipedia.org/wiki/Pavment gateways, on Jun. 6, 2014, pp. 1-3.

"Uber—Android Apps on Google Play," Published on Nov. 10, 2014, Retrieved from the Internet URL: https://slay.google.com/store/apps/details?id=com.ubercab&hl=en, on Nov. 12, 2014, pp. 1-2.

Goode, L., "Paying With Square's New Mobile-Payments App," All Things D, dated Apr. 30, 2012, Retrieved from the Internet URL: http://allthingsd.com/20120430/paying-with-squares-new-mobile-payments-app/, on Nov. 7, 2014, pp. 1-3.

Myres, L., "The Mac Security Blog: What is Multi-Factor Authentication, and How Will It Change in the Future?," Intego, dated Aug. 17, 2012, Retrieved from the Internet URL: http://www.intego.com/mac-security-blog/what-is-multi-factor-authentication-and-how-will-it-change-in-the-future/, on Nov. 11, 2014, pp. 1-4.

Wallen, J., "Five Top Appsfor Managing Inventory," Tech Republic, dated Aug. 15, 2012, Retrieved from the Internet URL: http://www.techrepublic.com/blog/five-apps/five-top-apps-for-managing-inventory/, on Nov. 10, 2014, pp. 1-7.

(56) References Cited

OTHER PUBLICATIONS

Carr, A., "How Square Register's UI Guilts You Into Leaving Tips," dated Dec. 12, 2013, Retrieved from the Internet URL: http://www.fastcodesign.com/3022182/innovation-by-design/how-square-registers-ui-guilts-you-into-leaving-tips, on Jul. 1, 2015, pp. 1-12.

Munson, J., and Gupta, V.K., "Location-Based Notification as a General-Purpose Service," dated Sep. 28, 2002, Retrieved from the Internet URL—https://ai2-s2-pdfs.s3.amazonaws.com/1 bb5/6ae0a70b030e2f2376ed246834bddcabd27b.pdf, pp. 40-44.

Shalmanese, "The Straight Dope Message Board," message dated Oct. 5, 2013, Retrieved from the Internet URL: http://boards.straightdope.com/sdmb/showthread.php?t=703989%BB, on Jul. 18, 2016, pp. 1-10.

Non-Final Office Action dated Apr. 10, 2014, for U.S. Appl. No. 14/160,490, of Moring, D., et al., filed Jan. 21, 2014.

Non-Final Office Action dated Jun. 26, 2014, for U.S. Appl. No. 14/252,714, of Bell, B., et al., filed Apr. 14, 2014.

Non-Final Office Action dated Jul. 18, 2014, for U.S. Appl. No. 14/252,712, of Bell, B., et al., filed Apr. 14, 2014.

Final Office Action dated Aug. 28, 2014, for U.S. Appl. No. 14/160,490, of Moring, D., et al., filed Jan. 21, 2014.

Non-Final Office Action dated Oct. 1, 2014, for U.S. Appl. No. 14/252,714, of Bell, B., et al., filed Apr. 14, 2014.

Advisory Action dated Nov. 18, 2014, for U.S. Appl. No. 14/160,490, of Moring, D., et al., filed Jan. 21, 2014.

Non-Final Office Action dated Dec. 8, 2014, for U.S. Appl. No. 14/220,057, of Maxwell, D.W., et al., filed Mar. 19, 2014.

Notice of Allowance dated Jan. 5, 2015, for U.S. Appl. No. 14/252,714, of Bell, B., et al., filed Apr. 14, 2014.

EIC 3600 Search Report dated Jan. 5, 2015, for U.S. Appl. No. 14/252,714, of Bell, B., et al., filed Apr. 14, 2014.

Final Office Action dated Mar. 2, 2015, for U.S. Appl. No. 14/252,712, of Bell, B., et al., filed Apr. 14, 2014.

Non-Final Office Action dated May 5, 2015, for U.S. Appl. No. 14/220,057, of Maxwell, D.W., et al., filed Mar. 19, 2014.

Final Office Action dated Jun. 25, 2015, for U.S. Appl. No. 14/252,712, of Bell, B., et al., filed Apr. 14, 2014.

Non-Final Office Action dated Jul. 10, 2015, for Design U.S. Appl. No. 29/484,510, of Bell, B., filed Mar. 10, 2014.

Advisory Action datd Aug. 21, 2015, for U.S. Appl. No. 14/252,712, of Bell, B., et al., filed Apr. 14, 2014.

Final Office Action dated Oct. 14, 2015, for U.S. Appl. No. 14/220,057, of Maxwell, D.W., et al., filed Mar. 19, 2014.

Non-Final Office Action dated Jan. 14, 2016, for U.S. Appl. No. 14/252,712, of Bell, B., et al., filed Apr. 14, 2014.

Advisory Action dated Feb. 10, 2016, for U.S. Appl. No. 14/220,057, of Maxwell, D.W., et al., filed Mar. 19, 2014.

Non-Final Office Action dated May 9, 2016, for U.S. Appl. No. 14/220,057, of Maxwell, D.W., et al., filed Mar. 19, 2014.

Final Office Action dated Jun. 7, 2016, for Design U.S. Appl. No. 29/484,510, of Bell, B., filed Mar. 10, 2014.

Non-Final Office Action dated Jun. 13, 2016, for U.S. Appl. No. 14/252,716, of Bell, B., et al., filed Apr. 14, 2014.

Non-Final Office Action dated Jul. 14, 2016, for U.S. Appl. No. 14/160,490, of Moring, D., et al., filed Jan. 21, 2014.

Notice of Allowance dated Jul. 21, 2016, for U.S. Appl. No. 14/252,712, of Bell, B., et al., filed Apr. 14, 2014.

Final Office Action dated Oct. 26, 2016, for U.S. Appl. No. 14/220,057, of Maxwell, D.W., et al., filed Mar. 19, 2014.

Final Office Action dated Nov. 1, 2016, for U.S. Appl. No. 14/160,490, of Moring, D., et al., filed Jan. 21, 2014.

Ex Parte Quayle Action dated Dec. 20, 2016, for Design U.S. Appl. No. 29/484,510, of Bell, B., filed Mar. 10, 2014.

Advisory Action dated Jan. 26, 2017, for U.S. Appl. No. 14/220,057, of Maxwell, D.W., et al., filed Mar. 19, 2014.

Notice of Allowance dated Mar. 16, 2017, for Design U.S. Appl. No. 29/484,510, of Bell, B., filed Mar. 10, 2014.

Non-Final Office Action dated Apr. 18, 2017, for U.S. Appl. No. 14/160,490, of Moring, D., et al., filed Jan. 21, 2014.

Non-Final Office Action dated May 15, 2017, for U.S. Appl. No. 14/220,057, of Maxwell, D.W., et al., filed Mar. 19, 2014.

Final Office Action dated Aug. 10, 2017, for U.S. Appl. No. 14/160,490, of Moring, D., et al., filed Jan. 21, 2014.

Non-Final Office Action dated Aug. 14, 2017, for Design U.S. Appl. No. 29/484,510, of Bell, B., filed Mar. 10, 2014.

Final Office Action dated Oct. 11, 2017, for U.S. Appl. No. 14/220,057, of Maxwell, D.W., et al., filed Mar. 19, 2014.

Advisory Action dated Oct. 31, 2017, for U.S. Appl. No. 14/160,490, of Moring, D., et al., filed Jan. 21, 2014.

Non-Final Office Action dated Dec. 19, 2017, for Design U.S. Appl. No. 29/484,510, of Bell, B., filed Mar. 10, 2014.

Non-Final Office Action dated Mar. 26, 2018, for U.S. Appl. No. 15/331,594, of Bell, B., et al., filed Oct. 21, 2016.

Notice of Allowance dated Jun. 29, 2018, for Design U.S. Appl. No. 29/484,510, of Bell, B., filed Mar. 10, 2014.

Notice of Allowance dated Jul. 31, 2018, for Design U.S. Appl. No. 29/484,510, of Bell, B., filed Mar. 10, 2014.

Final Office Action dated Nov. 16, 2018, for U.S. Appl. No. 15/331,594, of Bell, B., et al., filed Oct. 21, 2016.

Notice of Allowance dated Mar. 13, 2019, for U.S. Appl. No. 15/331,594, of Bell, B., et al., filed Oct. 21, 2016.

Advisory Action dated Oct. 5, 2020, for U.S. Appl. No. 16/452,474, of Bell B., et al., filed Jun. 25, 2019.

First Examination Report for Australian Patent Application No. 2020202007, dated Dec. 8, 2020.

Non-Final Office Action dated Nov. 24, 2020, for U.S. Appl. No. 16/875,964, of Maxwell, D.W., et al., filed May 15, 2020.

Votice of Allowance dated Nov. 4, 2020, for U.S. Appl. No. 16/452,474, of Bell B., et al., filed Jun. 25, 2019.

Final Office Action dated Jul. 10, 2020, for U.S. Appl. No. 16/452,474, of Bell B., et al., filed Jun. 25, 2019.

Non-Final Office Action dated Aug. 3, 2020, for U.S. Appl. No. 16/875,964, of Maxwell, D.W., et al., filed May 15, 2020.

Final Office Action dated Mar. 25, 2021, for U.S. Appl. No. 16/875,964, of Maxwell, D.W., et al., filed May 15, 2020.

Advisory Action dated May 14, 2021, for U.S. Appl. No. 16/875,964, of Maxwell, D.W., et al., filed May 15, 2020.

Examiner Requisition for Canadian Patent Application No. 2951839, dated Apr. 13, 2021.

Second Examination Report for Australian Patent Application No. 2020202007, dated May 12, 2021.

Notice of Allowance dated Jun. 29, 2021, for U.S. Appl. No. 16/875,964, of Maxwell, D.W., et al., filed May 15, 2020.

Corrected Notice of Allowability dated Jul. 16, 2021, for U.S. Appl. No. 16/875,964, of Maxwell, D.W., et al., filed May 15, 2020.

Notice of Acceptance for Australian Patent Application No. 2020202007, dated Jul. 30, 2021.

Notice of Grant for Australian Patent Application No. 2020202007, dated Nov. 25, 2021.

\* cited by examiner

AUTOMATIC TRIGGERING OF RECEIPT DELIVERY

CROSS-REFERENCE TO RELATED APPLICATIONS

This application claims the priority of U.S. patent application Ser. No. 14/160,490, filed Jan. 21, 2014, and granted Oct. 20, 2020 as U.S. Pat. No. 10,810,682, and U.S. Provisional Application No. 61/921,064, filed Dec. 26, 2013. The contents of the above-identified applications are incorporated herein by reference in their entirety.

BACKGROUND

Many financial transactions are conducted electronically due to the increasing popularity and acceptance of the computer and mobile devices. Many merchants have started to provide their customers with receipts electronically to maintain record of the financial transactions. The existing electronic receipt solutions, however, often require a considerable amount of activation energy before the actual receipt gets generated and delivered to the customer. For the merchants, such high energy efforts involve, for example, having to generate manually the receipt every time a transaction occurs, having to identify an appropriate method to deliver the receipt to the customer, and having to build their own infrastructure to support electronic receipts. For the customers, the high energy efforts involve, for example, having to re-learn and re-setup a new receipt account for every new merchant.

BRIEF DESCRIPTION OF THE DRAWINGS

One or more embodiments of the disclosed technology are illustrated by way of example and are not limited by the figures of the accompanying drawings, in which like references indicate similar elements.

DETAILED DESCRIPTION

Figure 1:
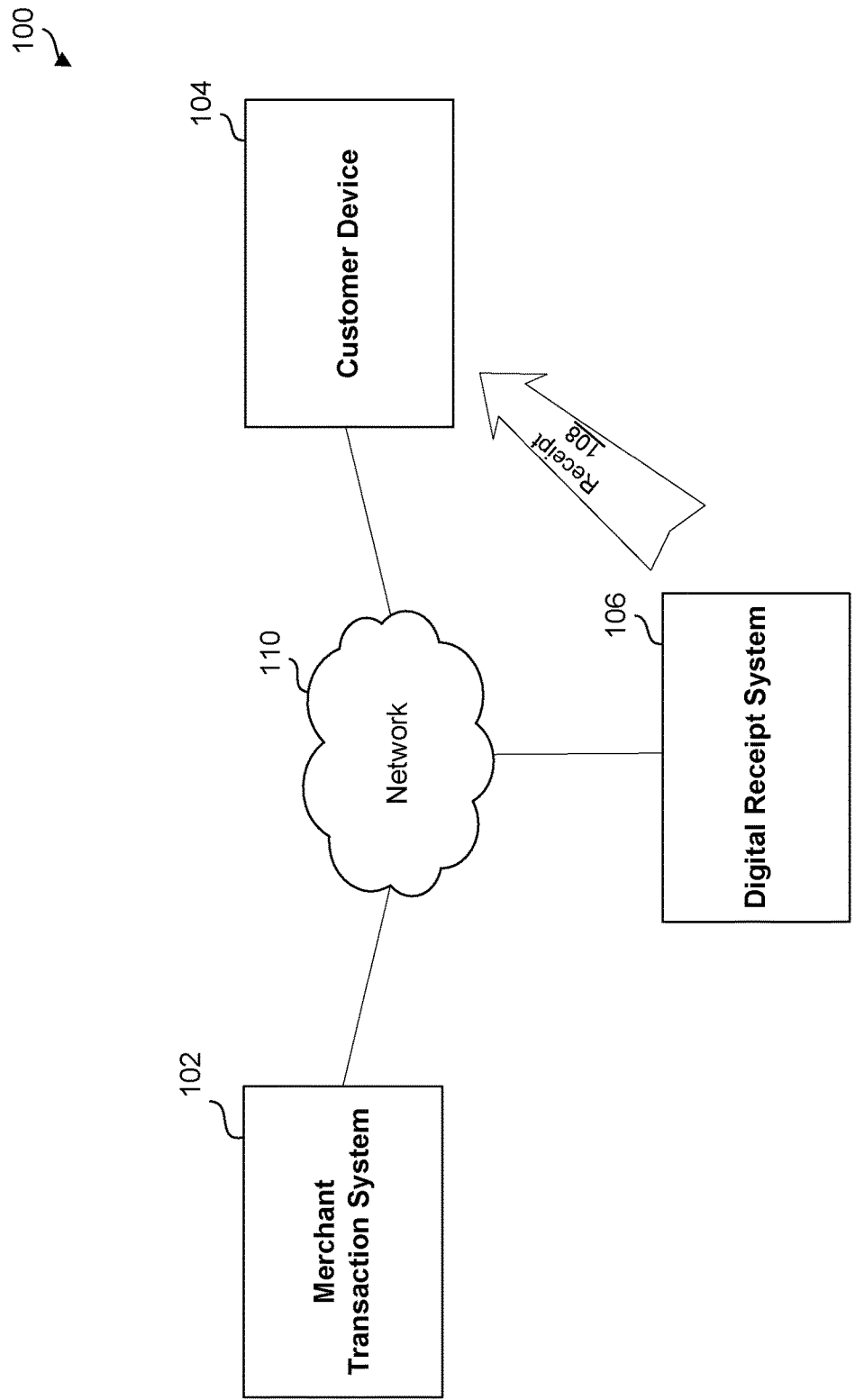
FIG. 1 is an environment in which various embodiments of a receipt delivery technology can be implemented.

References in this description to "an embodiment", "one embodiment", or the like, mean that the particular feature, function, structure or characteristic being described is included in at least one embodiment of the present technology. Occurrences of such phrases in this specification do not necessarily all refer to the same embodiment. On the other hand, such references are not necessarily mutually exclusive.

Overview

Introduced herein is a technology for automatically triggering delivery of a digital receipt for a financial transaction based on a previously stored electronic address for receiving a digital receipt (or "electronic receipt"). Using the electronic address stored from one or more past financial transactions, a new electronic receipt associated with a new transaction can be automatically delivered to the user, regardless of the new transaction being with the same merchant from the one or more past transactions.

In at least some embodiments, the disclosed technology includes a digital receipt system that is configured to communicate with one or more payment transaction systems to enable automatic triggering of receipt delivery. The one or more payment transaction systems are associated with one or more merchants conducting financial transactions with a customer (i.e., "user," "consumer", "payer," "purchaser," or the like). A merchant's payment transaction system can be, for example, a payment card reader attached to a mobile device operating as a point of sale (POS) system for the merchant's business.

The POS system can be configured to receive and store certain transaction information from a customer in a transaction. The transaction information can include, for example, payment information such as a payment card number (e.g., credit card number), a payment card name (e.g., first and last name of customer who is a cardholder of the card), or a payment account address information (e.g., country code). The POS system can receive such transaction information, for example, through a card reader swipe, where data, typically stored on a magnetic stripe of the payment card, can be transferred from the card to the POS system.

The POS system can receive additional information associated with each transaction from a customer's submission. The additional information can include an electronic address for a customer to receive a digital receipt (or electronic receipt). In some instances, the additional information can include a receipt delivery preference associated with the delivery address. For example, at a first transaction, when the customer uses her credit card for the first time to tender payment (e.g., swipes credit card through a card reader), the POS system, working in coordination with the digital receipt system, can prompt the customer whether she wants to receive a digital receipt for the transaction (i.e., receipt delivery preference), and can ask the customer to submit an electronic address (e.g., an email address) for such delivery.

After the first transaction, the digital receipt system, working with the POS system, can associate and store the credit card details with the electronic address submitted by the customer for future uses. In such an example, the next time the customer utilizes the same credit card (even with a new merchant with whom she has not previously conducted any transaction), the information from the new transaction gets correlated with the stored transaction information, the previously stored electronic address associated with the credit card is identified, and a new receipt is automatically sent to the electronic address.

The POS system can transmit to the digital receipt system the transaction information and other related information for receipt delivery to the customer. The transaction information includes information from both a past transaction and a current transaction. The digital receipt system analyzes the current transaction information to identify a matching payment account number (e.g., credit card number) with the past transaction information. From the past transaction information having the matching account number, the digital receipt system identifies a previously stored electronic address associated with the matching account number. In response to identifying the delivery address, the digital receipt system sends a digital receipt for the current transaction to the customer.

The following is an exemplary and illustrative scenario of the technology presented herein. Consider a scenario where a user uses credit card A1 at a first merchant. At this point, using a user interface provided at the first merchant's POS system, the user submits a mobile telephone number for receiving a digital receipt. The first merchant's receipt is then sent to the user's phone (e.g., as a text message). From that transaction onward, when the user visits a second merchant (with whom she has not previously done any transaction), the use of credit card A1 allows the second merchant's receipt to be automatically sent to the user's phone.

It is noted that such "automatic" triggering (i.e., initiating e-delivery of a receipt to an electronic address without requiring entry of the electronic address from the user at the point of transaction) of the receipt may happen even without the physical use of the actual credit card A1 at the second merchant's POS terminal (e.g., card reader swipe). For example, when the user submits the credit card number on a web page for an internet-based transaction, or uses the credit card in a "card-less" transaction using a digital wallet (or an "e-wallet"), or recites the numbers of the credit card over a telephone transaction, or uses credit card A1 in any transaction as may be contemplated by a person of ordinary skill in the art, such uses would still auto-trigger the receipt assuming that the user has at least once previously used the credit card and associated that previous transaction with an electronic address for e-delivery of receipt.

In at least some embodiments, the POS system, working in coordination with the digital receipt system, prompts the customer for a receipt delivery preference and associates it with the payment card. In some embodiments, the POS system prompts for the receipt delivery preference at a first-time transaction in which the payment card is first used. In some embodiments, the POS system prompts for the receipt delivery preference at transactions subsequent to the first-time transaction. The receipt delivery preference can include whether the customer wants to receive a digital receipt, whether the customer prefers to receive the receipt at a particular electronic address (out of many addresses previously stored), or any combination thereof.

In some embodiments, the electronic address and the receipt delivery preference are stored and updated with every new transaction completed using the payment card. For example, in the scenario above, the second merchant's POS system may simply ask if the user would like electronic delivery of her receipt for the transaction, instead of automatically sending the receipt to the phone number associated with the credit card A1. Upon the user affirming the electronic delivery, the digital receipt system described herein, working in coordination with the POS system, causes the second merchant's receipt to be sent to the user's phone number, without the need for collecting the user's phone number at the second merchant's POS system.

In some embodiments, the POS system, working in coordination with the digital receipt system, prompts for the receipt delivery preference every time a transaction takes place. For example, at the end of a transaction, the customer is automatically prompted whether she wishes to receive a digital receipt; once the customer selects to receive the receipt, the digital receipt is sent automatically to the customer at the stored electronic address, without the customer being prompted to submit an electronic address.

In some embodiments, the POS system prompts for the receipt delivery preference only when there exist more than one stored electronic addresses that correspond to the customer's payment card. For example, the customer has submitted, from past transactions, several email addresses for receiving the digital receipt. In such example, the POS system, working in coordination with the digital receipt system, prompts the customer to select one of the email addresses as the preference for receipt delivery. In another example, two customers, who share the same payment account, utilize their respective payment cards (with same account number, but different payment card names), and submit two different electronic addresses (e.g., an email for customer X and a phone number for customer Y) in separate transactions X and Y. In such an example, when customer Y conducts a new transaction, the digital receipt system analyzes transactions Y and Z information to identify the appropriate payment card name and a corresponding electronic address, and causes a receipt to be automatically delivered to that address.

In some embodiments, the POS system prompts for the receipt delivery preference based on certain criteria associated with the transaction, such as payment amount threshold or account holder names associated with the payment card. For example, the POS system, working in coordination with the digital receipt system, prompts for a receipt delivery preference when the transaction payment exceeds $1000; otherwise, the receipt is automatically delivered without prompting for the preference. In another example, the POS system prompts for a receipt delivery preference when the transaction involves a payment card having two different cardholder names (e.g., husband and wife), where the customer is prompted to select his/her own delivery address.

In at least some embodiments, the digital receipt system triggers transmission of the receipt based on fraud criteria associated with the transaction. The fraud criteria can include, for example, a geographical location, a payment amount, a frequency of use, or any combination thereof. For example, where a payment amount associated with a current transaction exceeds a threshold (e.g., $1000), the digital receipt system triggers the receipt to be generated and delivered to all cardholders associated with a payment card; that is, all joint cardholders receive a receipt for the current transaction at their respective electronic addresses. In another example, the digital receipt system delivers the receipt using a particular delivery address according to a stored receipt delivery preference of the customer in response to the purchase amount exceeding the threshold. In such example, the customer receives a receipt via both an email message and a text message, as specified by her submitted preference.

The technology disclosed provides many advantages in the realm of digital receipts. One advantage of the technology disclosed is providing an efficient, effortless way for automatic triggering of receipt delivery to an electronic address without requiring entry of the address from a customer at the point of transaction. Once a customer has submitted transaction information (along with an electronic address) to a merchant, the digital receipt system causes a receipt to be automatically delivered to the electronic address for every future transaction with the same merchant and/or any other new merchant, so long as the new merchant's POS system is in communication with the digital receipt system. That is, there is no prerequisite or activation energy needed for every new transaction the customer carries out with a merchant in order to receive a digital receipt.

Another advantage of the technology disclosed is that the stored information can be automatically updated with every new transaction conducted. For example, for a customer who has submitted an email address in transaction A and later submits a phone number in transaction B, the digital receipt system, working with one or more POS systems, can store and utilize both submissions for receipt delivery. In another example, a customer can submit a receipt delivery preference in addition to an electronic address for receiving the receipt. Such receipt delivery preference is also stored and updated with every new transaction.

Yet another advantage of the technology disclosed is providing fraud protection. The digital receipt system can be configured according to fraud criteria. As will be discussed in more details below, in response to a fraudulent activity detected, a digital receipt can be automatically delivered to the appropriate venue and/or the appropriate parties based on the fraud criteria.

Other aspects and advantages of the disclosed technique will become apparent from the following description in combination with the accompanying drawings, illustrating, by way of example, the principles of the claimed technique.

ILLUSTRATIVE EMBODIMENTS

FIG. 1 is an environment 100 in which various embodiments of a receipt delivery technology can be implemented. The environment 100 includes a merchant transaction system 102, a customer device 104, and a digital receipt system 106, all of which are connected via a network 110. It is noted that the architecture shown in FIG. 1 is only an example of an environment in accordance with the technology introduced here. Further, the merchant transaction system 102, the customer device 104, and the digital receipt system 106 in FIG. 1 can have more or fewer components than shown, or a different configuration of components. The various components shown in FIG. 1 can be implemented by using hardware, software, firmware or a combination thereof, including one or more signal processing and/or application specific integrated circuits.

The merchant transaction system 102 can be any general-purpose computing device, such as a mobile handheld device (e.g., smartphone, tablet, e-reader, etc.) or a personal computer (e.g., desktop), on which a merchant utilizes to conduct financial transactions with customers. The merchant transaction system 102 can include a payment card reader for receiving payment card information (e.g., credit card details, debit card details, smart card details, etc.) from the customers to authorize payment in exchange for services and/or goods. It is noted here that the term "customer" is used interchangeably with "user," "payer," "purchaser," or the like throughout the written description with no intended change in meaning. Any of these terms is used to refer to a party tendering payment in a financial transaction between the party and a merchant.

The merchant transaction system 102 is capable of executing an application, such as a payment application having various user interfaces for receiving payment card data ("transaction data" or "transaction information") and other related data associated with payment transactions between the merchant and one or more customers. The merchant transaction system 102 can collect the transaction information from a particular payment card using the payment card reader. For example, the merchant transaction system can read information from the magnetic stripe of the payment card via a swipe of the card through the card reader.

A payment card's magnetic stripe typically includes three tracks for storing different types of information associated with the payment card. One track is typically encoded with information reserved for the bank that issued the payment, such as the payment card number (e.g., primary account number), the cardholder's full name, a country code, and an expiration date for the card. A second track is typically used to store the payment card number, the country code, and the card's expiration date. A third track is typically used to both read and write data, such as an authorized spending amount or currency units and an encrypted personal identification number.

In embodiments, the merchant transaction system 102 can choose to collect the payment card's information from all tracks, from only one track, or from any combination thereof. For example, the merchant transaction system 102 collects only from a particular track that has only the credit card number. In another example, the merchant transaction system 102 collects from one or more necessary track(s) to obtain the cardholder's name listed on the payment card in addition to the credit card number. In yet another example, the merchant transaction system 102 collects from the necessary track(s) to obtain the credit card number, the cardholder's name, and address information associated with the credit card account.

In some embodiments, the merchant transaction system 102 collects additional data associated with the transaction instance in which the payment card is used, including, for example, a geographical location where the transaction takes place or a time of use of the payment card. Using the payment card information along with the additional data, the merchant transaction system 102 can provide "transaction information" associated with each payment card to assist the digital receipt system in enabling automatic receipt delivery. That is, the merchant transaction system 102 can communicate to the digital receipt system 106 the transaction information collected from a first card swipe to enable automatic receipt delivery in subsequent card swipes.

It is noted that the transaction information (e.g., credit card number, purchase location, etc.) may be obtained even without the physical use of the payment card at a physical location using the card reader, so long as the transaction information is collected via any device implementation in communication with the merchant transaction system 102. For example, a customer can submit a credit card number to pay for an internet-based transaction using an online web page portal implemented by the merchant transaction system 102. In another example, the customer uses the credit card in a "card-less" transaction using a digital wallet (or an "e-wallet"), and the digital wallet is connected to the merchant transaction system 102. In yet another example, the customer recites the numbers of the credit card over a telephone transaction, and an operator associated with the merchant transaction system 102 enters the transaction information into the system 102. The information collection may be implemented using any other transaction method that can be contemplated by a person of ordinary skill in the art based on the present disclosure.

The customer device 104 can be any general-purpose computing device with data processing and communication capabilities, such as a handheld mobile device (e.g., a smartphone, a tablet, an e-reader, etc.) or a personal computer (e.g., desktop). The customer device 104 can be utilized by a user, such as a customer, for receiving a digital receipt 108 from the digital receipt system 106. The customer device 104 is capable of executing an application, such as an email application or a text messaging application, for receiving the digital receipt 108. The digital receipt 108 can be in various formats, including, for example, an email format, an image format (e.g., a picture received via text message, email, etc.), a text message format, and the like. The customer device 104 can include a display screen (e.g., liquid crystal display) for displaying the digital receipt 108. The display screen can be part of a touchscreen.

The digital receipt system 106 can be any general-purpose computing server system with data processing and communication capabilities. The digital receipt system 106 works in coordination with the merchant transaction system 102 to facilitate automatic triggering of receipt delivery. The digital receipt system 106 can be in communication with one or more merchant transaction systems 102. Such communication is useful, for example, to enable processing of multiple automatic receipt deliveries to a customer, regardless of the merchant the customer is visiting. That is, the customer does not have to set up a new account with a new merchant in order to receive a digital receipt automatically, as long as the customer has already submitted an electronic address via a particular merchant transaction system 102 that is connected to the digital receipt system 106. The digital receipt system 106 stores the electronic address from the past transaction and utilizes it to automatically trigger receipt delivery for future transactions.

In some embodiments, the digital receipt system 106 can generate instructions for execution by the merchant transaction system 102 in facilitating the automatic triggering of the receipt delivery. For example, the digital receipt system 106 generates instructions for executing one or more user interfaces associated with a payment application implemented on the merchant transaction system 102. In facilitating the automatic triggering of receipt delivery, the digital receipt system 106 communicates with the merchant transaction system 102 to receive data signals indicative of one or more financial transactions taking place at the merchant transaction system 102. The data signals can include data associated with a transaction, including transaction information and/or additional information including an electronic address for receiving digital receipts associated with the payment card used in the transaction. The data signals may be received over a period of time associated with the one or more transactions in which the same payment card is utilized (e.g., a first time transaction, subsequent transaction, beginning and/or end of a particular transaction, etc.).

In response to receiving a particular data signal indicative of a first financial transaction in which a payment card is first utilized by a customer, the digital receipt system 106 can send certain instructions associated with the transaction, such as causing the merchant transaction system 102 to prompt a customer for an electronic address to receive a digital (or electronic) receipt for the transaction. Upon receiving the electronic address, the digital receipt system 106 can associates the address with one or more pieces of information from the transaction information (e.g., associating the electronic address with a credit card number used in the transaction, with a cardholder's name, and/or with an account address associated with the credit card). As will be discussed in further details below, in a future transaction with the same payment card, the digital receipt system 106 can trigger a receipt to be automatically delivered to the customer using the associated electronic address.

Figure 2:
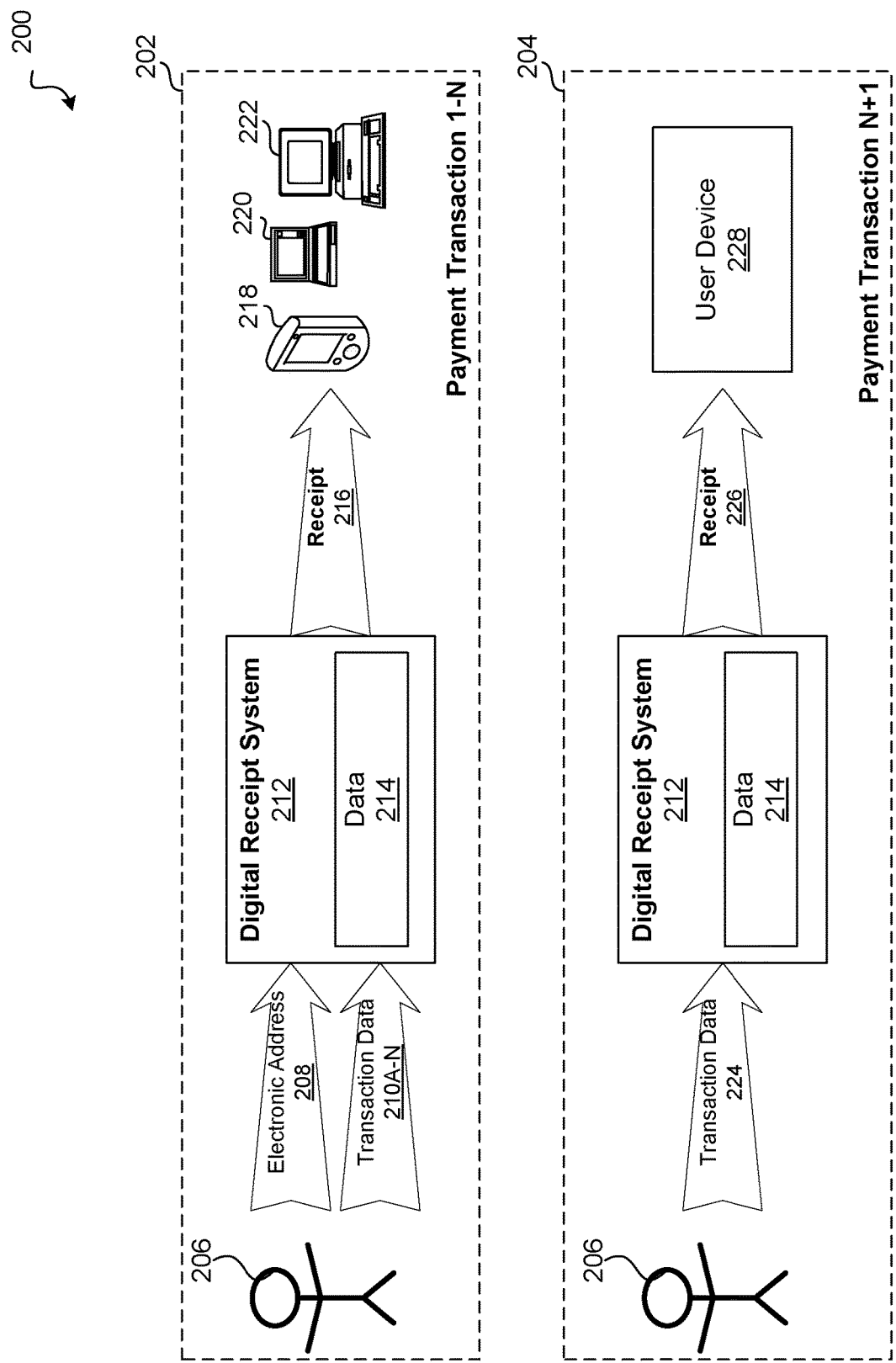
FIG. 2 is a block diagram illustrating a technique associated with the receipt delivery technology disclosed according to some embodiments.

FIG. 2 is a block diagram illustrating a technique 200 associated with the receipt delivery technology disclosed according to some embodiments. For the purpose of illustration, let the technique 200 include a set of past financial transactions 202 (i.e., "payment transactions 1–N," where N is the number of transactions occurring in the past), and further include a set of present, or current, financial transactions 204 (i.e., "payment transactions N+1," where N is the number of transactions occurring in the past).

In the set of past financial transactions 202, the digital receipt system 212 receives, from a merchant's POS system, transaction data 210A-N associated with a payment card used by a consumer 206 to tender payment to the merchant. That is, the merchant's POS system transmits (or allows access to) the transaction data 210A-N to the digital receipt system 212 to enable receipt delivery. In some embodiments, the digital receipt system 212 can be the digital receipt system 106 of FIG. 1.

The set of past transactions 202 are particular transactions in which a digital receipt 214 has been sent to a consumer, e.g., to a consumer device, such as a smartphone 216, a laptop 218, or a desktop 220. The transaction data 210A-N include information associated with the past transactions 202 conducted between the consumer 206 and one or more merchants. The transaction data 210A-N can include payment card information along with additional information associated with the corresponding transaction. For example, the additional information can include a geographical location or a timing at which the transaction took place. The digital receipt system 212 can use any of the additional information, in addition to the payment card information, associated with the past transactions 202 to automatically trigger delivery, or transmission, of a receipt 224 to an appropriate recipient in a future transaction 204.

From the set of past financial transactions 202, the digital receipt system 212 can obtain an electronic delivery address (or "electronic address") 208 provided by a consumer 206 for receiving one or more digital receipt(s) associated with a payment card used in one or more past transactions. The electronic address 208 can be an email address, a mobile telephone number, or any other electronic address at which the consumer 206 can receive a digital receipt, as contemplated by one of ordinary skill in the art.

The consumer 206 in FIG. 2 can represent more than one account owner associated with a primary account number, where the primary account number is shared among the account owners using their respective payment cards having different cardholder names. In some embodiments, the digital receipt system 212 stores and associates the electronic address 208 based on the cardholder name. For example, consumer 206 can be a husband and a wife sharing the same debit card (having the same debit card number with different cardholder names), where each party has utilized his/her own copy of the debit card to make several purchases. For each transaction carried out by each party using the debit card, transaction data 210A-N is received and stored by the merchant's system, and communicated to (or accessed by) the digital receipt system 212. Further, for each transaction, an electronic address 208 can be prompted, or requested from the party making the transaction. In such an example above, the electronic address 208 can be different for the debit card, depending on which cardholder, e.g., the wife or the husband, is using the debit card.

The digital receipt system 212 analyzes the transaction data 210A-N collected in the set of past transactions 202 for use in future transactions 204, i.e., the payment transactions N+1. In a particular new payment transaction 204, the digital receipt system 212 receives new transaction data 222 and analyzes that data to find a matching payment card number with the past transaction data 210A-N. Upon finding a subset of the set of transaction data 210A-N having matching payment card number with the transaction data 222, the digital receipt system 212 analyzes each of the subset of transaction data 210A-N to identify the electronic address 208 associated with that payment card number. The electronic address can be, for example, an email submitted for that payment card number in the past transactions 210A and 210B.

It is noted that the transaction data 210A-N and transaction data 222 can be in connection with two different merchants with whom the consumer 206 carries out a payment transaction. For example, a transaction data 210A can be data associated with a transaction X1 conducted between the consumer 206 and merchant M1, and the transaction data 222 can be data associated with a transaction X2 conducted between the consumer 206 and merchant M2. In such an example, upon occurrence of the transaction X2 with merchant M2, the digital receipt system 212 automatically causes delivery of the digital receipt 226 to the customer 206 using the electronic address stored from the transaction X1, despite the customer 206 having never conducted a transaction with the merchant M2 before the current transaction 204.

In some embodiments, the digital receipt system 212, before triggering delivery of the receipt, performs additional analysis to identify a cardholder name associated with the matching payment card number in each of the past transactions (e.g., 210A and 210B). In such embodiments, the digital receipt system 212 compares the cardholder's name on the payment card used in the current transaction 204 with each cardholder's name identified in the past transactions 202 (e.g., 210A and 210B) to find a matching cardholder's name. For the particular past transaction data that contains the matching cardholder's name, the digital receipt system 212 extracts the associated electronic address stored for that particular past transaction 202, and transmits the current receipt 224 using data associated with that electronic address (e.g., email address).

In the example above, after analysis of the transaction data 201A-N and transaction data 224, the digital receipt system 212 automatically triggers delivery of the digital receipt 224 for the new transaction 204. The receipt for the transaction 204 is sent, for example, to the email address that corresponds only to the cardholder's name of the current transaction, and not to both the husband and the wife. In some embodiments, only the primary account number is collected and stored, with no consideration given to the cardholder's name on a particular payment card being utilized in a particular transaction. In such embodiments, the digital receipt system causes the receipt to be delivered the electronic address 208 previously stored and associated with the payment card number, regardless of the cardholder's name.

Figure 3:
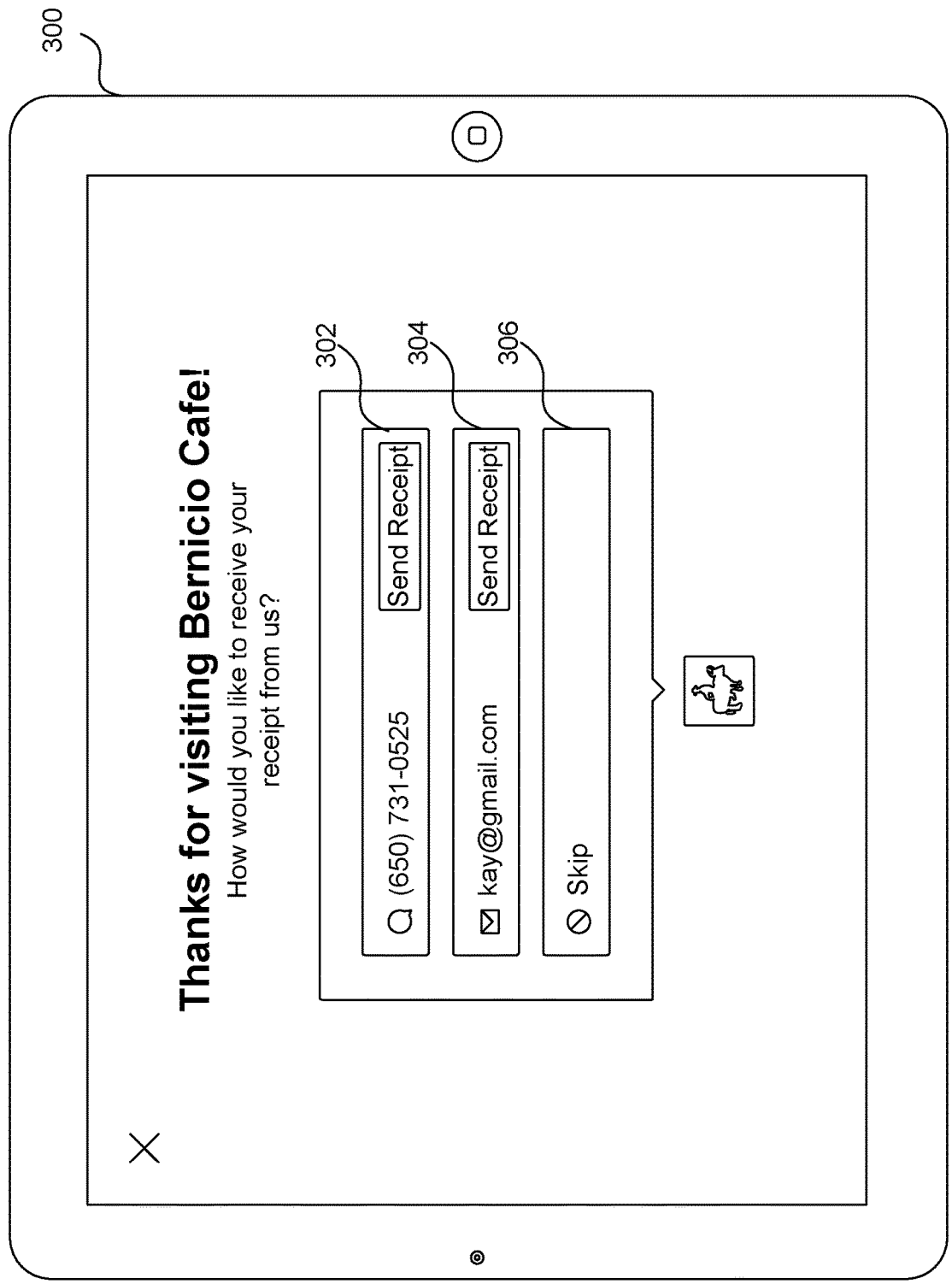
FIG. 3 is a block diagram illustrating a user interface associated with the receipt delivery technology according to some embodiments.

FIG. 3 is a block diagram illustrating a user interface 300 associated with the receipt delivery technology according to some embodiments. The user interface 300 can be implemented on a POS system utilized by a payee (e.g., merchant) to conduct financial transactions with a payer (e.g., customer). The user interface 300 can be generated using computer-executable instructions received from the digital receipt system 106 of FIG. 1. The user interface 300 illustrates an example prompting of a receipt preference from a payer.

Consider a scenario at the end of a payment transaction, when payment has been tendered by the payer, the POS system, working in coordination with the digital receipt system disclosed herein, prompts the payer for a selection of an electronic address for receiving digital receipts. The selection can include receiving a digital receipt via a text message 302, where the POS system prompts the payer to submit a telephone number (i.e., one type of electronic address). The selection can include receiving the digital receipt via an email message 304, where the POS system prompts the payer to submit an email address. The selection can include no digital receipt, where the payer can select the option 306 not to enter an electronic address and skip receiving a digital receipt.

Figure 4:
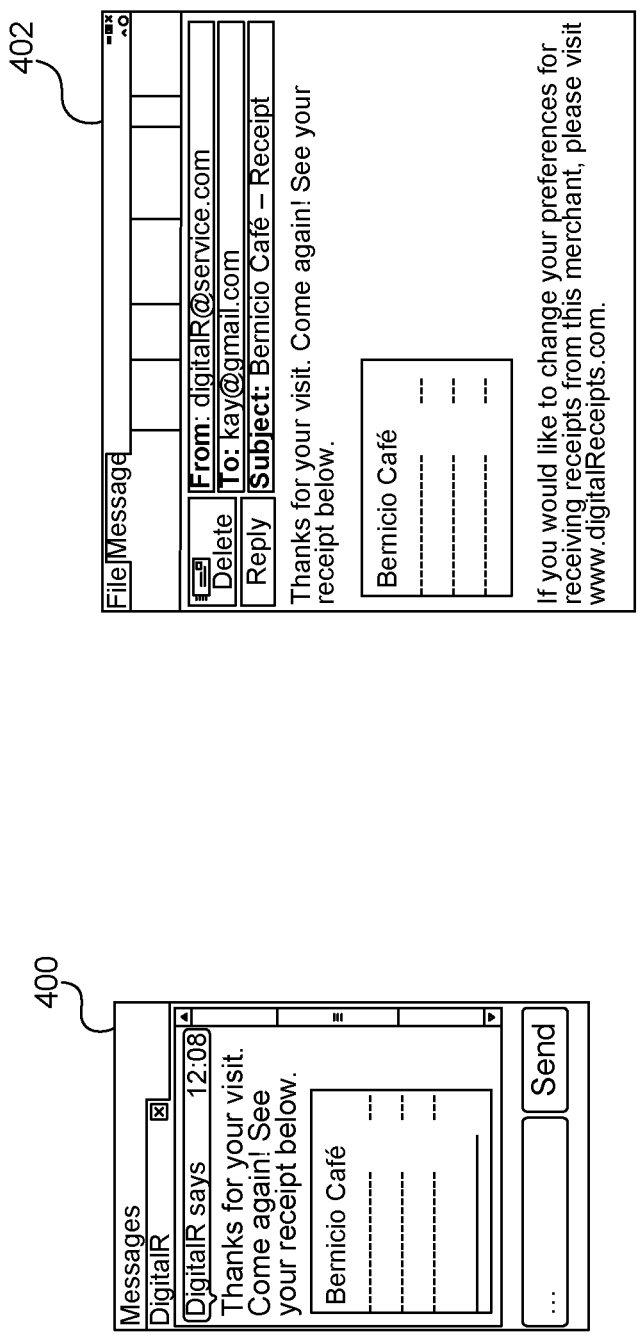
FIG. 4 is a block diagram illustrating various embodiments of a receipt associated with the receipt delivery technology.

FIG. 4 is a block diagram illustrating various embodiments of a digital receipt associated with the receipt delivery technology. In some embodiments, a digital receipt system can deliver the digital receipt, indicative of a current transaction, to an appropriate recipient via a text message 400. In such embodiments, the digital receipt system delivers the receipt using a stored telephone number from one or more past transactions associated with the current transaction. In some embodiments, the receipt can be delivered via an email message 402. In such embodiments, the digital receipt system delivers the receipt using an email address from the one or more past transactions.

Figure 5:
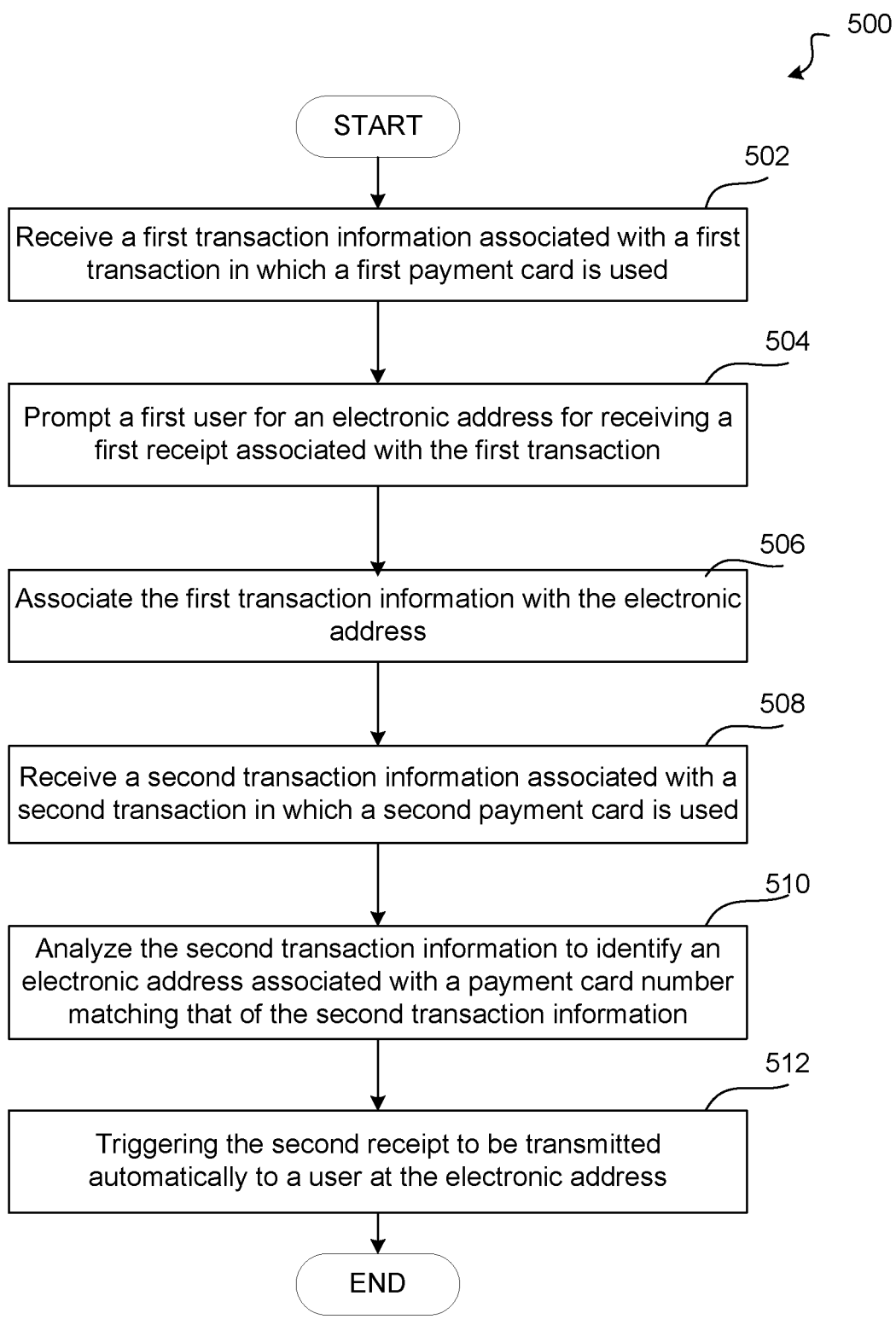
FIG. 5 is a flow diagram illustrating a process of automatically triggering a receipt delivery according to some embodiments.

FIG. 5 is a flow diagram illustrating a process 500 of automatically triggering a receipt transmission according to some embodiments. The process 500 can be performed by the digital receipt system 106 of FIG. 1, or the digital receipt system 212 of FIG. 2, working in conjunction with the merchant transaction system 104 of FIG. 1. At step 502, the digital receipt system receives from a merchant transaction system an indication of a first financial transaction, such as a payment transaction, between a merchant and a consumer. The indication includes first transaction information associated with the first transaction, where a first payment card is used in the transaction. The first transaction information can include payment card information, including an account number associated with the first payment card, a name associated with the cardholder of the payment card, and a country code associated with the payment card financial account. For example, the first transaction information includes payment card information associated with the first payment card (i.e., "first payment information" or "first payment card information").

In some embodiments, the first transaction information can also include information external to the payment card, where the external information is detected and stored with the payment card information at the time of the transaction. The external information can include, for example, a geographical location (e.g., GPS coordinates, location name, etc.) associated with the occurrence of the transaction. The external information can include, in another example, timing associated with the occurrence of the transaction (e.g., time of day card is being used). The external information can include, in yet another example, a frequency of use of the payment card associated with the transaction.

Such external information can be useful in detecting suspicious fraudulent activities. For example, where a payment card is used numerous times repeatedly in a short period, or where the charge amounts on the payment card is considerably high, the card has likely been stolen. Using the external information, the digital receipt system can trigger receipt delivery to one or more electronic addresses in response to the detected fraudulent activity. For example, the digital receipt system is configured to send an electronic receipt to all account holder names associated with a card account in response to detection of fraudulent activity.

At step 504, a first user is prompted to submit an electronic address for receiving a first receipt associated with the first transaction. The prompting can appear on a display of a POS device associated with the merchant transaction system. The prompting can be caused by the digital receipt system sending computer-executable instructions to the merchant transaction system.

In some embodiments, the POS device prompts for a receipt delivery preference in addition to the electronic address. The receipt delivery preference may include, for example, whether the first user would like to receive an electronic, or digital, receipt. The receipt delivery preference may include, in another example, whether the first user would like to specify a preferred electronic address (out of several submitted by the first user) for receiving the digital receipt. The receipt delivery preference may include, in yet another example, whether the first user would like to specify certain preferred electronic addresses (out of several submitted by the first user) for receiving the digital receipt in case of fraudulent activity.

At step 506, the digital receipt system associates the electronic address with the first transaction information and stores such association. This is useful, for example, for allowing the digital receipt system to identify the appropriate electronic address for receipt delivery in future transactions having transaction information that correlate to the first transaction information. The correlation can include a payment card number of the new transaction matching to the stored number associated with the first payment card. It is noted that other information extracted from a payment card, other than a card account number, can be utilized by the digital receipt system. For example, an encoded personal pin can be utilized for identifying correlations between the first payment card and any other payment cards (e.g., credit card of a joint account holder) utilized in future transactions.

In some embodiments, the digital receipt system associates the receipt delivery preference, in addition to the electronic address, with the first transaction information. Using in part the receipt delivery preference, the digital receipt system causes the automatic delivery of the receipt to an appropriate electronic address (based on the preference).

At step 508, the digital receipt system receives a second transaction information associated with a second transaction in which a second payment card is used. At step 510, the digital receipt system analyzes the second transaction information to identify a payment card number and an electronic address previously stored and associated with that payment card number. In particular, the digital receipt system identifies the payment card number from the second transaction information to be matching with the payment card number from the first transaction information. The digital receipt system then identifies one (or more) electronic address that has been associated with the payment card number from the first transaction.

In some embodiments, if the digital receipt system identifies two or more electronic addresses that are associated with the payment card number, then the system proceeds to compare the cardholder names between the current transaction information and a prior transaction information. Using the name comparison, the digital receipt system identifies a particular electronic address that corresponds to the cardholder name indicative of the user using the payment card at the current transaction, and triggers for receipt delivery to that particular electronic address. For example, if a first transaction information contains user X (with electronic address X) and a second transaction information contains user Y (with electronic address Y), the digital receipt system will send a receipt for a third transaction information, which has the name of user X, to the electronic address X.

In some embodiments, if the digital receipt system identifies two or more electronic addresses that are associated with the payment card number, and determines that only one cardholder name corresponds to the multiple electronic addresses (e.g., two prior transactions exist with two different addresses submitted, but only one cardholder name), the digital receipt system proceeds to take into consideration the receipt delivery preference associated with each of the multiple electronic addresses, as discussed above at step 504. In some embodiments, the digital receipt system analyzes an immediately previous (or most recent past) transaction prior to the current transaction to identify the user's receipt delivery preference, and select an appropriate electronic receipt based on that previous transaction.

In some embodiments, the digital receipt system analyzes all past transactions prior to the current transaction and identify the user's receipt delivery preference. For example, while the user may have specified in the immediately previous transaction to receive the receipt at address X, in the rest of the past transactions, the user specified all digital receipts to be sent to address Y as the default electronic address. In such an example, the digital receipt system causes the receipt to be sent to address Y.

At step 512, in response to identifying the matching information, the digital receipt system analyzes the first transaction information to determine a receipt preference that is associated with the matching information. In some embodiments, the receipt preference is associated with the first transaction information in step 506. At step 514, the digital receipt system triggers the second receipt to be transmitted automatically to a user associated with the second transaction using the identified receipt preference.

Figure 6:
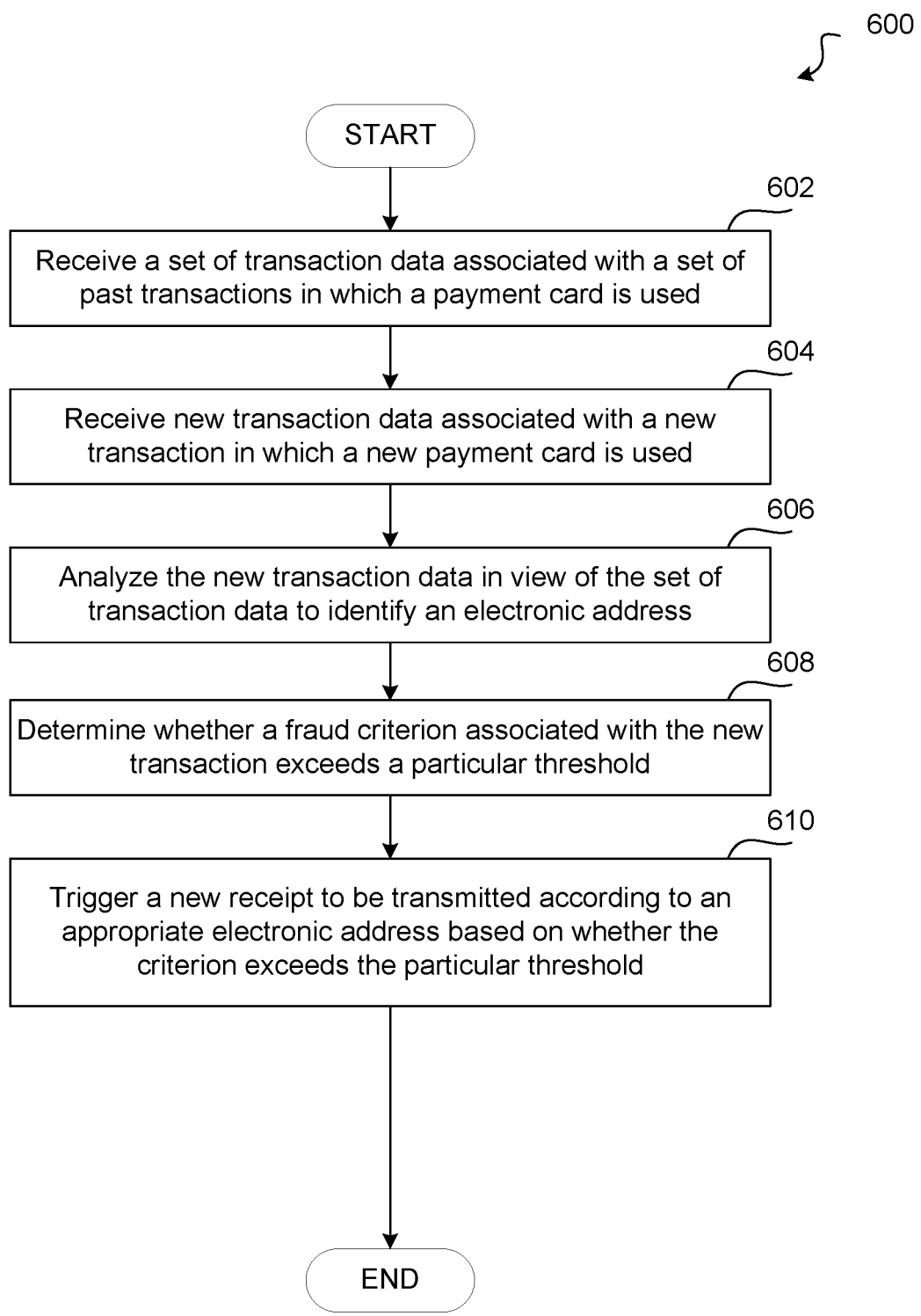
FIG. 6 is a flow diagram illustrating a process of automatically triggering a receipt delivery having fraud protection according to some embodiments.

FIG. 6 is a flow diagram illustrating a process 600 of automatically triggering a receipt transmission having fraud protection according to some embodiments. The process 600 can be performed by the digital receipt system 106 of FIG. 1 working in conjunction with the merchant transaction system 102 of FIG. 1.

At step 602, the digital receipt system receives a set of transaction data associated with a set of past transactions in which a payment card is used. The digital receipt system receives the set of transaction data from one or more merchants' POS systems in order to facilitate automatic receipt delivery for the merchants and their respective consumers. The transaction data can include payment data associated with the payment card and external data associated with the set of past transactions (i.e., data collected at the past transactions, where the data is external to the payment card's internal information such as location information). The set of transaction data may or may not include data shared with a current transaction (i.e., "matching data"). For example, a subset of the transaction data can match with data from a particular transaction (e.g., matching account number) while another subset of the transaction data can match with data from a different transaction (e.g., matching cardholder names in addition to matching account number).

At step 604, the digital receipt system receives new transaction data associated with a new transaction in which a new payment card is used. The new transaction data includes payment data associated with the new payment card, such as a payment card account number. Other payment data may include, for example, a cardholder's name. Similar to step 602, the digital receipt system receives the new transaction data from a particular merchant's POS system. The particular merchant in the new transaction may or may not be the same merchant in the set of past transactions.

At step 606, the digital receipt system analyzes the new transaction data to identify a payment card number. Using the card number, the digital receipt system identifies one or more previously stored electronic address(es) associated with the card number by analyzing the set of transaction data. In particular, the digital receipt system identifies any subset of transaction data that correlate to the new transaction data. For example, from a set of data from five past transactions, the digital receipt system identifies three past transactions having payment data correlated to the payment data associated with the current transaction. The correlated data includes, for example, a matching account number, where the matching account number may have different cardholder names (e.g., a parent and a child sharing the same account).

In response to identifying the subset of transaction data, the digital receipt system identifies the one or more electronic addresses from the subset. For example, the digital receipt system identifies two transactions having matching primary account number, and two different electronic addresses corresponding to the two transactions. Consider a scenario where in a past transaction X, a user A submits an email address to receive a digital receipt, and in a later transaction Y, the user A submits a telephone number to receive a digital receipt. In some embodiments, the digital receipt system is configured to prioritize the transactions, i.e., to utilize the particular electronic address submitted from the most recent past transaction. In the example above, the digital receipt system will cause the receipt to be delivered to the telephone number of user A.

In some embodiments, the digital receipt system is configured to further analyze each past transaction data to identify for any other matching data, including a matching payment card name (i.e., matching name of the cardholder) and determine the appropriate electronic address corresponding to that name. For example, where transaction X is carried out by user A while transaction Y is carried out by user B, and user A and user B share the same account number for the same payment card, the digital receipt system will only cause the receipt to be delivered to user B's electronic address for a current transaction conducted by user B.

At step 608, the digital receipt system analyzes whether a fraud criterion associated with the new transaction exceeds a particular threshold. Whether or not the fraud criterion exceeds the threshold determines the electronic address(es) to which the digital receipt system sends out the digital receipt, as indicated in step 610. The fraud criterion can be associated with a purchase amount. For example, a fraud alert is raised if the purchase amount associated with the new transaction is over $2000. In some embodiments, when the fraud alert is raised, the digital receipt system sends a receipt indicative of the new transaction to all stored electronic addresses associated with the payment card, regardless of the cardholder name associated with each electronic address.

In some embodiments, when the fraud criterion exceeds the threshold, the digital receipt system sends the receipt to all receipt addresses associated with a cardholder of the payment card. For example, where a cardholder has given his phone number in a past transaction, but submits an email address to receive his digital receipt in a later transaction, the digital receipt system sends a receipt to both the email address and the phone number to alert the cardholder of potential fraud. In some embodiments, when the fraud criterion exceeds the threshold, the digital receipt system sends the receipt to a particular cardholder and not the remaining cardholder(s). For example, when a child, who shares the same account with a sibling and his parent, makes a purchase exceeding the threshold amount, the parent, in addition to the child himself, receives the receipt, and the sibling sharing the account does not receive a receipt.

At step 610, the digital receipt system triggers transmission of a new receipt according to an appropriate electronic address associated with the new transaction based on the fraud criterion.

Figure 7:
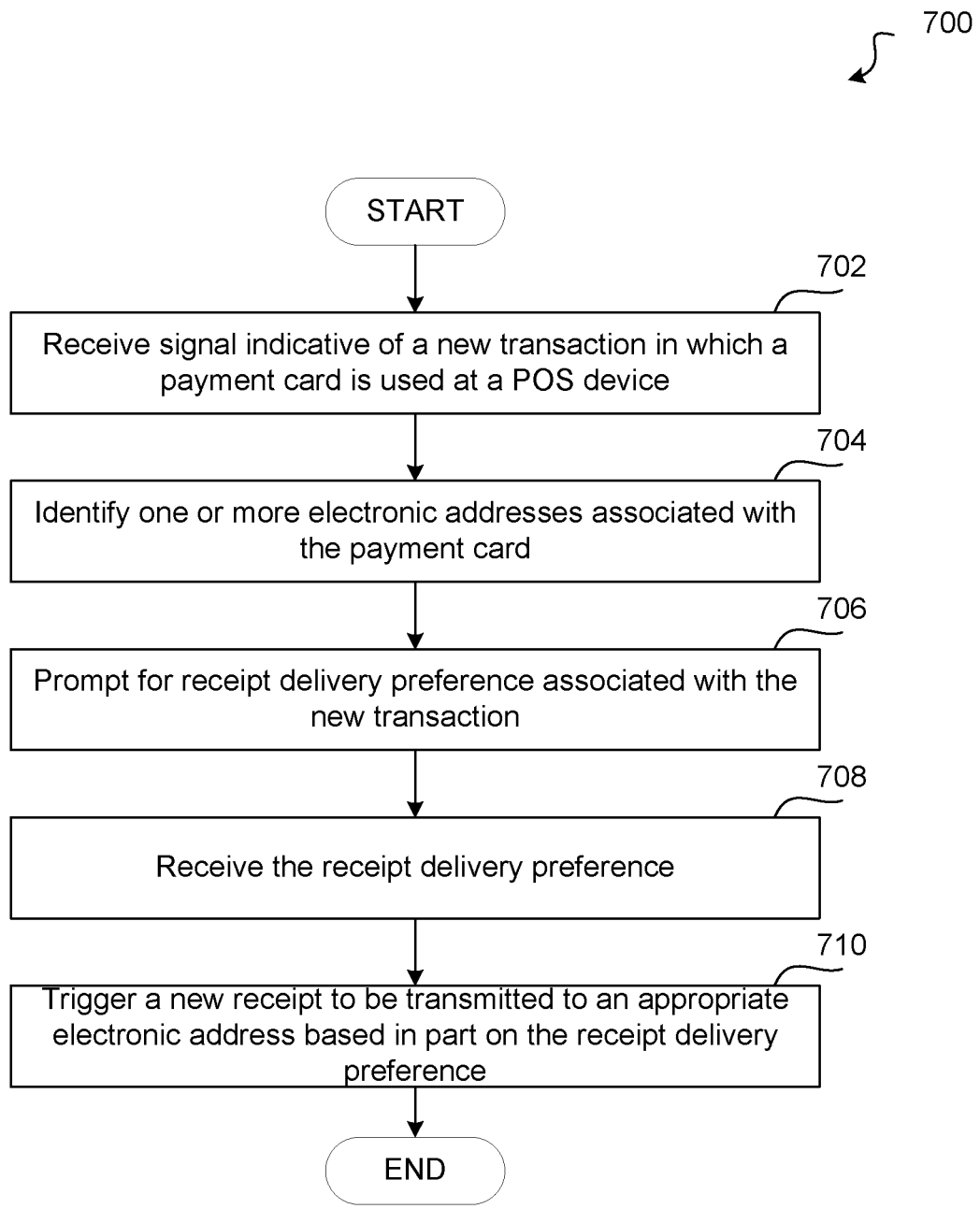
FIG. 7 is a flow diagram illustrating a process of automatically triggering a receipt delivery based on a receipt delivery preference according to some embodiments.

FIG. 7 is a flow diagram illustrating a process 700 of automatically triggering a receipt delivery based on a receipt delivery preference according to some embodiments. The process 700 can be performed by the digital receipt system 106 of FIG. 1 working in conjunction with the merchant transaction system 102 of FIG. 1.

At step 702, the digital receipt system disclosed herein receives a signal indicative of a new transaction associated with a payment card being used at a merchant's POS device. The signal includes transaction data associated with the new transaction. The transaction data can include payment data associated with the payment card and external data associated with the new transaction.

At step 704, the digital receipt system identifies one or more electronic addresses associated with the new transaction data. For example, the digital receipt system determines a payment card account number from the new transaction data and identifies, from past transaction data, a previously stored electronic address associated with a payment card having the same account number. In some instances, the digital receipt system may identify more than one previously stored electronic addresses associated with the payment card used in the new transaction.

At step 706, the digital receipt system prompts for a receipt delivery preference from a user using the payment card in the new transaction. In particular, the digital receipt system causes the merchant to request from the user at the merchant's POS device the receipt delivery preference for receiving the digital receipt. In some embodiments, the POS device, working in coordination with the digital receipt system, may simply ask the user whether he wishes to receive a digital receipt for the new transaction. In some embodiments, the POS device, working in coordination with the digital receipt system, may also display several electronic addresses identified in step 704 and ask the user whether the user wants to receive the digital receipt at a particular electronic address (from the displayed addresses). In some embodiments, the POS device, working in coordination with the digital receipt system, may also display the one or more electronic addresses identified in step 704, and prompts the user whether the user wants the digital receipt to enter a different electronic address (from the one(s) displayed) for receiving the digital receipt. Any combination of the prompting of receipt delivery preference may be executed at step 706.

At step 708, the digital receipt system receives the receipt delivery preference submitted by the user in step 706. At step 710, if the user selects to receive the digital receipt, the digital receipt system triggers the receipt to be delivered to the electronic address identified in step 704, without further need for the user to submit a delivery address. In some instances, where there exists several electronic addresses (i.e., as displayed to the user) and the user selects a particular electronic address (or multiple electronic addresses), the digital receipt system triggers the receipt to be delivered to that particular electronic address(es).

Regarding the processes 500, 600, and 700, while the various steps, blocks, or sub-processes are presented in a given order, alternative embodiments can perform routines having steps, or employ systems having steps, blocks or sub-processes, in a different order. Further, some steps, sub-processes or blocks can be deleted, moved, added, subdivided, combined, and/or modified to provide alternatives or sub-combinations. Each of these steps, blocks or sub-processes can be implemented in a variety of different ways. Also, while the steps, sub-processes or blocks are at times shown as being performed in series, some steps, sub-processes, or blocks can be performed, instead, in parallel or at different times, as will be readily recognized by a person of ordinary skill in the art in light of the disclosure herein. Additionally, any specific numbers noted herein are only by example as alternative implementations can employ differing values or ranges.

Figure 8:
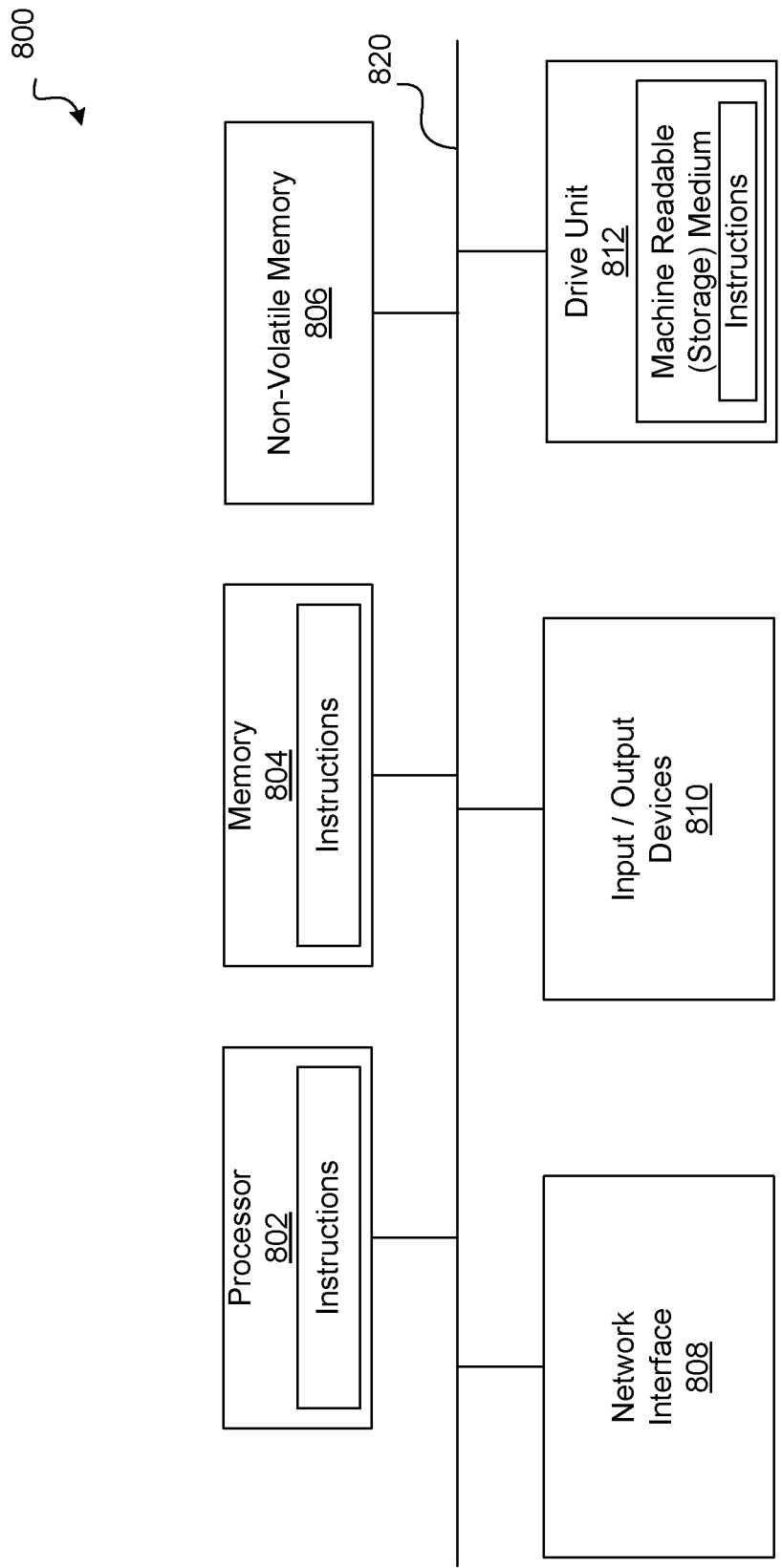
FIG. 8 is a block diagram illustrating a computer system within which a set of instructions, for causing the machine to perform one or more of the techniques discussed herein, can be executed.

FIG. 8 is a block diagram illustrating a computer system 800 within which a set of instructions, for causing the machine to perform one or more of the techniques discussed herein, can be executed. The computer system 800 can be the digital receipt system 106 of FIG. 1, or the digital receipt system 212 of FIG. 2, or the merchant transaction system 102 of FIG. 1, or the customer device 104 of FIG. 1. The computer system 800 includes a processor 802, a memory 804, non-volatile memory 806, a network interface 808, input/output (I/O) devices 810, and a drive unit 812. Various common components (e.g., cache memory) are omitted for illustrative simplicity. The computer system 800 is intended to illustrate a hardware device on which any of the components depicted in the example of FIGS. 1-5 (and any other components described in this specification) can be implemented. The computer system 800 can be of any applicable known or convenient type. The components of the computer system 800 can be coupled together via a bus 820 or through some other known or convenient device.

This disclosure contemplates the computer system 800 taking any suitable physical form. As example and not by way of limitation, computer system 800 can be an embedded computer system, a system-on-chip (SOC), a single-board computer system (SBC) (such as, for example, a computer-on-module (COM) or system-on-module (SOM)), a desktop computer system, a laptop or notebook computer system, an interactive kiosk, a mainframe, a mesh of computer systems, a mobile telephone, a personal digital assistant (PDA), a server, or a combination of two or more of these. Where appropriate, computer system 800 can include one or more computer systems 800; be unitary or distributed; span multiple locations; span multiple machines; or reside in a cloud, which can include one or more cloud components in one or more networks. Where appropriate, one or more computer systems 800 can perform without substantial spatial or temporal limitation one or more steps of one or more methods described or illustrated herein. As an example and not by way of limitation, one or more computer systems 800 can perform in real time or in batch mode one or more steps of one or more methods described or illustrated herein. One or more computer systems 800 can perform at different times or at different locations one or more steps of one or more methods described or illustrated herein, where appropriate.

The processor 802 can be, for example, a conventional microprocessor such as an Intel Core microprocessor or an Intel Itanium microprocessor or a Motorola power PC microprocessor or a SPARC architecture processor. One of skill in the relevant art will recognize that the terms "machine-readable (storage) medium" or "computer-readable (storage) medium" include any type of device that is accessible by the processor.

The memory 804 is coupled to the processor 802 by, for example, a bus. The memory 804 can include, for example, random access memory (RAM), such as dynamic RAM (DRAM) or static RAM (SRAM). The memory can be local, remote, or distributed.

The bus 820 also couples the processor 802 to the non-volatile memory 806 and the drive unit 812. The non-volatile memory 806 can be, for example, a magnetic floppy or hard disk, a magnetic-optical disk, an optical disk, a flash memory such as NAND flash memory or NOR flash memory, a read-only memory (ROM) such as a CD-ROM, a programmable read-only memory such as EPROM or EEPROM, a magnetic or optical card, or another form of storage for large amounts of data. Some of this data is often written, by a direct memory access process, into memory during execution of software in the computer 800. The non-volatile storage can be local, remote, or distributed. The non-volatile memory is optional because systems can be created with all applicable data available in memory. A typical computer system will usually include at least a processor, memory, and a device (e.g., a bus) coupling the memory to the processor.

Software is typically stored in the non-volatile memory and/or the drive unit. Indeed, for large programs, storing the entire program in memory can not even be possible. Nevertheless, one should understand that for software to run, if necessary, the software is moved to a computer readable location appropriate for processing, and for illustrative purposes, that location is referred to as the memory in this specification. Even when software is moved to the memory for execution, the processor will typically make use of hardware registers to store values associated with the software, and local cache that, ideally, serves to speed up execution. As used herein, a software program is assumed to be stored at any known or convenient location (from non-volatile storage to hardware registers) when the software program is referred to as "implemented in a computer-readable medium." A processor is considered to be "configured to execute a program" when at least one value associated with the program is stored in a register readable by the processor.

The bus 820 also couples the processor 802 to the network interface device 808. The interface 808 can include one or more of a modem or network interface. A person of ordinary skill will appreciate that a modem or network interface can be considered to be part of the computer system 800. The interface 808 can include an analog modem, ISDN modem, cable modem, token ring interface, satellite transmission interface (e.g., "direct PC"), Wi-Fi interface, or other interfaces for coupling a computer system to other computer systems. The interface can include one or more input and/or output devices.

The I/O devices 810 can include, for example, a keyboard, a mouse or other pointing device, disk drives, printers, a scanner, and other input and/or output devices, including a display device. The display device can include, for example, a cathode ray tube (CRT), liquid crystal display (LCD), or some other applicable known or convenient display device. For simplicity, this specification assumes that controllers of any devices not depicted in the example of FIG. 8 reside in the interface.

The computer system can have one Bus or multiple Buses. The bus 820 can include, for example, a system bus, a Peripheral Component Interconnect (PCI) bus or PCI-Express bus, a HyperTransport or industry standard architecture (ISA) bus, a small computer system interface (SCSI) bus, a universal serial bus (USB, USB 2.0, USB 3.0), IIC (I2C) bus, an Institute of Electrical and Electronics Engineers (IEEE) standard 1394 bus, also called "Firewire," a QuickPath Interconnect bus, a ThunderBolt interconnect bus, a DisplayPort interconnect bus or its companion standards Mini DisplayPort (mDP), Direct Drive Monitor (DDM), Embedded DisplayPort (eDP), Internal DisplayPort (iDP), Portable Digital Media Interface (PDMI), Wireless DisplayPort (wDP), and Mobility DisplayPort (MyDP), an HDMI interconnect bus, a DVI bus.

In operation, the computer system 800 can be controlled by operating system software that includes a file management system, such as a disk operating system. One example of operating system software with associated file management system software is the family of operating systems known as Windows® from Microsoft Corporation of Redmond, Wash., and their associated file management systems. Another example of operating system software with its associated file management system software is the Linux™ operating system and its associated file management system. The file management system is typically stored in the non-volatile memory and/or drive unit and causes the processor to execute the various acts required by the operating system to input and output data and to store data in the memory, including storing files on the non-volatile memory and/or drive unit.

Summary

The foregoing description of the embodiments of the technology has been presented for the purpose of illustration; it is not intended to be exhaustive or to limit the technology to the precise forms disclosed. Persons skilled in the relevant art can appreciate that many modifications and variations are possible in light of the above specification.

Any of the steps, operations, or processes described herein can be performed or implemented with one or more hardware or software modules, alone or in combination with other devices. In one embodiment, a software module is implemented with a computer program product comprising a computer-readable medium containing computer program code, which can be executed by a computer processor for performing any or all of the steps, operations, or processes described.

Embodiments of the technology can also relate to an apparatus for performing the operations herein. This apparatus can be specially constructed for the required purposes, and/or it can comprise a general-purpose computing device selectively activated or reconfigured by a computer program stored in the computer. Such a computer program can be stored in a non-transitory, tangible computer readable storage medium, or any type of media suitable for storing electronic instructions, which can be coupled to a computer system bus. Furthermore, any computing systems referred to in the specification can include a single processor or can be architectures employing multiple processor designs for increased computing capability.

Embodiments of the technology can also relate to a product that is produced by a computing process described herein. Such a product can comprise information resulting from a computing process, where the information is stored on a non-transitory, tangible computer readable storage medium and can include any embodiment of a computer program product or other data combination described herein.

What is claimed is:

1. A method comprising:
    receiving, by a payment processing system (PPS) and from a plurality of merchant computing devices, wherein an individual merchant computing device is associated with a merchant of a plurality of merchants that use the PPS to process payments, transaction information associated with transactions between individual merchants of the plurality of merchants and respective buyers, the plurality of merchant computing devices having respective instances of a merchant application installed thereon for configuring the plurality of merchant computing devices as a plurality of respective point-of-sale (POS) terminals for communicating the transaction information over a network to the PPS;
    storing, by the payment processing system, in one or more data structures, the transaction information;
    obtaining, by the PPS and through a first POS terminal associated with a first merchant, an identifier identifying a buyer performing a first transaction with the first merchant and payment-instrument information identifying a payment instrument used for the first transaction;
    associating, by the PPS and in the one or more data structures, the identifier with the payment-instrument information;
    detecting, by the PPS, a second transaction between a second merchant operating a second POS terminal and the buyer, wherein detecting is based on mapping an identifier of a buyer performing the second transaction with the identifier in the one or more data structures;
    generating, by the PPS, a digital transaction record, wherein the digital transaction record confirms processing of the second transaction between the buyer and the second merchant; and
    transmitting, by the PPS, the digital transaction record to the buyer through a communication medium defined by the identifier of the buyer.

2. The method as claim 1 recites, wherein the identifier comprises an electronic address associated with the buyer.

3. The method as claim 2 recites, wherein the electronic address associated with the buyer comprises at least one of an email address of the buyer or a telephone number associated with the buyer.

4. The method as claim 2 recites, wherein transmitting the digital transaction record comprises transmitting the digital transaction record via the electronic address associated with the buyer.

5. The method as claim 1 recites, further comprising:
    detecting, by the PPS, a third transaction between a third merchant operating a third POS terminal and the buyer;
    determining, by the PPS and based at least in part on detecting the third transaction, that a purchase amount associated with the third transaction is greater than a threshold purchase amount;
    based at least in part on the purchase amount being greater than the threshold purchase amount, causing, by the PPS, display on the third POS terminal of a prompt for the buyer to select a delivery preference;
    receiving, by the PPS and from the third POS terminal, an indication of the delivery preference; and
    facilitating, by the PPS, transmission of a third digital transaction record to the buyer according to the delivery preference.

6. The method as claim 5 recites, wherein the delivery preference comprises at least one of:

a preference to receive the third digital transaction record at a new electronic address; or a preference to receive the third digital transaction record at multiple electronic addresses.

7. A system comprising:
one or more processors; and
one or more computer-readable media storing instructions executable by the one or more processors, wherein the instructions program the one or more processors to perform acts comprising:
  receiving, by a payment processing system (PPS) and from a plurality of merchant computing devices, wherein an individual merchant computing device is associated with a merchant of a plurality of merchants that use the PPS to process payments, transaction information associated with transactions between individual merchants of the plurality of merchants and respective buyers, the plurality of merchant computing devices having respective instances of a merchant application installed thereon for configuring the plurality of merchant computing devices as a plurality of respective point-of-sale (POS) terminals for communicating the transaction information over a network to the PPS;
  storing, by the payment processing system, in one or more data structures, the transaction information;
  obtaining, by the PPS and through a first POS terminal associated with a first merchant, an identifier identifying a buyer performing a first transaction with the first merchant and payment-instrument information identifying a payment instrument used for the first transaction;
  associating, by the PPS and in the one or more data structures, the identifier with the payment-instrument information;
  detecting, by the PPS, a second transaction between a second merchant operating a second POS terminal and the buyer, wherein detecting is based on mapping an identifier of a buyer associated with the second transaction with the identifier in the one or more data structures;
  generating, by the PPS, a digital transaction record, wherein the digital transaction record confirms processing of the second transaction between the buyer and the second merchant; and
  transmitting, by the PPS, the digital transaction record to the buyer through a communication medium defined by the identifier of the buyer in the one or more data structures.

8. The system as claim 7 recites, wherein the identifier comprises an electronic address associated with the buyer.

9. The system as claim 8 recites, wherein the electronic address associated with the buyer comprises at least one of an email address of the buyer or a telephone number associated with the buyer.

10. The system as claim 8 recites, wherein transmitting the digital transaction record comprises transmitting the digital transaction record via the electronic address associated with the buyer.

11. The system as claim 8 recites, further comprising:
causing, by the PPS, the first POS terminal to display an interface that prompts the buyer to submit the electronic address for receiving a digital transaction record associated with the first transaction; and
obtaining, by the PPS and based on the interface, the electronic address from the buyer,
wherein transmitting the digital transaction record comprises transmitting the digital transaction record to the electronic address.

12. The system as claim 7 recites, wherein detecting the second transaction is further based at least in part on an indication that the buyer is present at a location associated with the second merchant.

13. A method performed by a payment processing system (PPS) comprising:
  receiving, by the PPS and from a plurality of point-of-sale (POS) devices associated with respective merchants that use the PPS to process payments, transaction information associated with transactions between the merchants and respective buyers;
  obtaining, by the PPS and through a first POS device of the plurality of POS devices, an identifier identifying a buyer performing a first transaction with a first merchant associated with the first POS device and payment-instrument information identifying a payment instrument used for the first transaction;
  associating, by the PPS and in one or more data structures, the identifier with the payment-instrument information;
  receiving, by the PPS, an indication of a second transaction between a second merchant and the buyer, wherein the indication is based at least in part on mapping an identifier identifying a buyer performing the second transaction with the identifier in the one or more data structures;
  generating, by the PPS, a digital transaction record, wherein the digital transaction record confirms processing of the second transaction between the buyer and the second merchant; and
  transmitting, by the PPS, the digital transaction record to the buyer through a communication medium defined by the identifier in the one or more data structures.

14. The method as claim 13 recites, wherein the second transaction comprises an online transaction.

15. The method as claim 13 recites, wherein the POS device comprises a first POS device and wherein the second transaction occurs at a second POS device of the second merchant.

16. The method as claim 13 recites, further comprising:
determining, by the PPS, that a transaction amount for the second transaction is below a threshold transaction amount,
wherein transmitting the digital transaction record to the buyer is based at least in part on determining that the transaction amount for the second transaction is below the threshold transaction amount.

17. The method as claim 13 recites, further comprising processing, by the PPS, a payment for the first transaction.

18. The method as claim 13 recites, further comprising processing, by the PPS, a payment for the second transaction.

19. The method as claim 13 recites, wherein the identifier comprises an electronic address associated with the buyer.

20. The method as claim 19 recites, wherein the electronic address associated with the buyer comprises at least one of an email address of the buyer or a telephone number associated with the buyer, and wherein transmitting the digital transaction record comprises transmitting the digital transaction record via the electronic address associated with the buyer.

* * * * *